United States Patent
Auslander et al.

(10) Patent No.: US 8,328,922 B2
(45) Date of Patent: *Dec. 11, 2012

(54) POSTAL BLUE INK WITH HIGH RELIABILITY

(75) Inventors: Judith D. Auslander, Westport, CT (US); Richard A. Bernard, Norwalk, CT (US); Shunichi Higashiyama, Yokkaichi (JP); Akihiko Taniguchi, Kakamigahara (JP); Noriatsu Aoi, Ichinomiya (JP)

(73) Assignee: Pitney Bowes Inc., Stamford, CT (US)

( * ) Notice: Subject to any disclaimer, the term of this patent is extended or adjusted under 35 U.S.C. 154(b) by 236 days.

This patent is subject to a terminal disclaimer.

(21) Appl. No.: 12/344,831

(22) Filed: Dec. 29, 2008

(65) Prior Publication Data

US 2010/0166959 A1 Jul. 1, 2010

(51) Int. Cl.
*C09D 11/02* (2006.01)
(52) U.S. Cl. ............... 106/31.28; 106/31.58; 106/31.6; 106/31.86
(58) Field of Classification Search ............... 106/31.28, 106/31.58, 31.6, 31.86; 347/100
See application file for complete search history.

(56) References Cited

U.S. PATENT DOCUMENTS

| | | | | | |
|---|---|---|---|---|---|
| 5,938,829 | A | * | 8/1999 | Higashiyama et al. | 106/31.58 |
| 7,074,267 | B2 | * | 7/2006 | Coughlin et al. | 106/493 |
| 7,141,103 | B2 | * | 11/2006 | Auslander et al. | 106/31.32 |
| 7,244,296 | B2 | * | 7/2007 | Kato et al. | 106/31.27 |
| 7,594,719 | B2 | * | 9/2009 | Tomioka et al. | 347/100 |
| 7,972,425 | B2 | * | 7/2011 | Auslander et al. | 106/31.28 |
| 2007/0256593 | A1 | * | 11/2007 | Koike et al. | 106/31.28 |
| 2008/0229973 | A1 | * | 9/2008 | Auslander et al. | 106/31.43 |
| 2008/0229975 | A1 | * | 9/2008 | Auslander et al. | 106/31.86 |
| 2010/0166959 | A1 | * | 7/2010 | Auslander et al. | 427/256 |
| 2010/0166960 | A1 | * | 7/2010 | Auslander et al. | 427/256 |

* cited by examiner

*Primary Examiner* — Helene Klemanski
(74) *Attorney, Agent, or Firm* — George M. Macdonald; Charles R. Malandra, Jr.; Steven J. Shapiro

(57) ABSTRACT

A water-based ink for inkjet recording exhibits a blue color defined as $L^*<45$, $25<C^*<28$, $255<h<278$, and comprises a mixture of dyes and pigments, glycerol and polyethylene glycol #200 as water-soluble organic solvents and a polymeric dispersant. The ink will preferably have a ratio of glycerol to polyethylene glycol 200 within the range of from 2:1 to 3.5 1. The water-based ink preferably includes C.I. Pigment Blue 60 as a colorant and provides good printing stability and good storage stability. Tests show the inks to have good jettability.

15 Claims, No Drawings

POSTAL BLUE INK WITH HIGH RELIABILITY

RELATED APPLICATIONS

The present application is related to U.S. application Ser. No. 12/344,840, now U.S. Pat. No. 7,972,425, entitled "Postal Blue Ink with Improved Durability", filed on the date of this application, the application incorporated by reference herein in its entirety.

FIELD OF THE INVENTION

The invention disclosed in the illustrative embodiments presented herein relates generally to blue postal inks adapted for inkjet printing and capable of providing clear images on a broad range of substrates, meeting a variety of competing requirements necessary for postal use.

BACKGROUND OF THE INVENTION

It has been a common problem that posts, especially the major European Posts, have adopted the color blue for their franking inks. This decision was due to the larger absorbance range of the blue in the visible spectrum as opposed to red inks. Most of the detectors in the available postal scanners are optimized for OCR mainly in black and, therefore, will be more suitable to detect blue than red. Since various European Posts have different and sometimes contradictory requirements, there is a need for a single ink that will satisfy all European and possibly other postal requirements.

One important requirement which is contradictory to others, is for extremely high contrast on porous substrates (>70%) while keeping the color blue with certain limits for the color parameters contradicting the high contrast requirement. Blue does not inherently exhibit high contrast, and the formulation modifications necessary to achieve a blue coloration on some substrates will not necessarily work on others.

Other contradictory parameters working against the identification of a single blue postal ink are the need waterfastness along with high contrast (high loading of the colorant) and reliability (decap time, purging). An important attribute of inkjet ink is "decap" time, i.e., the time a nozzle can remain dormant and then still fire a drop without misdirection or loss of velocity. Decap is to some extent affected by ink vehicle evaporation which leaves behind a deposit of nonvolatile ingredients that are detrimental to jetting performance. In other words, to achieve waterfastness and high contrast, it may be necessary to provide high concentrations of pigment and/or dyes, and this can adversely affect purging and decap properties.

There is a clear need for a blue postal ink for inkjet printing that is capable of providing high contrast, machine-readable images, especially those containing bar code information, on a broad range of substrates while meeting a diverse array of regulatory requirements.

SUMMARY OF THE INVENTION

The present invention provides blue inkjet ink compositions and methods of printing and printed substrates employing them.

The blue ink compositions of the invention are water-based inks for inkjet recording and comprise colorant mixtures comprising blue pigments, preferably C.I. Pigment Blue 60 and dyes in combination with glycerol and polyethylene glycol 200 (i.e., MW 200) at a ratio of glycerol to polyethylene glycol of from 2:1 to 3.5:1 as water-soluble organic solvents, and water. The ink compositions of the invention are characterized by good printing stability and good storage stability. They exhibit highly reliable print head operation, especially in terms of printing without capping, and preferably meet many other, often contradictory performance criteria, including, inter alia: printing on diverse envelope surfaces, readability of 2D bar codes on porous and coated substrates, blue color defined as $L^*<45$, $25<C^*<28$, $255<h<278$, waterfastness, drying time, lightfastness, and abrasion resistance.

In one aspect, the inks of the invention comprise: a colorant mixture comprising pigments and dyes, preferably C.I. Pigment Blue 60 in combination with red and yellow dyes; triethylene glycol monobutyl ether as a penetrant, a styrene acrylic copolymer as a polymeric dispersant, glycerol and polyethylene glycol 200 as water-soluble organic solvents, and water.

In another aspect, the invention provides a process for printing an image having a visible, blue image with at least 70% contrast, comprising: providing a piezoelectric or thermal inkjet printer with an ink as described in above, and printing an image with the ink on a substrate.

In another aspect, the invention provides printed image prepared by the process described above.

Other preferred and alternative aspects of the invention will be described below.

DETAILED DESCRIPTION OF THE PRESENT INVENTION

The present invention provides blue inkjet ink compositions and methods of printing and printed substrates employing them.

The blue ink compositions of the invention include colorant mixtures to produce machine readable images by inkjet printing having a blue color defined as $L^*<45$, $25<C^*<28$, $255<h<278$ and enable meeting many, often contradictory performance criteria. Preferably, the ink compositions of the invention meet at least two of the following criteria, and most preferably meet them all:

waterfastness, preferably of at least about 80% of original optical density (OD), obtained by measuring the optical density of a solid block area 24 hours after printing, and again after soaking in deionized water for 5 minutes and drying (Ref. ISO18935-2005(E)) (using a K 700 postage machine and an optical densitometer RD914 with a visual filter);

drying time of less than about 1 second for a US Type A envelope and less than about 10 seconds for a German No. 1 envelope, drying time being the time for the image to be sufficiently dry that no smear occurs by rubbing with a cotton swab (using a K 700 postage machine);

lightfastness, preferably of at least about 90% of original optical density, obtained by measuring the optical density of a solid block area and the blue scale 2, 24 hours after printing, and again after exposure to xenon light for 23.5 hours (Ref. ISO2835-1974(E)) (using a K 700 postage machine, Xenon lightfastness tester Blue scale 2, and an optical densitometer RD914 with a visual filter); and good jettability, which means that printing occurs from all nozzles after a print head is left uncovered at 60° C. and 40% relative humidity for a day after printing and then purged (cleaned).

Desirably, the ink compositions of the invention will be capable of printing images with at least 70% contrast on diverse envelope surfaces, with at least 99% machine readability of 2D bar codes on porous and coated substrates. They are used in the conventional manner to print images by inkjet printers of the thermal and the piezoelectric types. The printed images are of superior quality in terms of color, durability, waterfastness, light fastness and/or drying time.

Inks according to the invention for use as inkjet inks are desirably stable chemically in aqueous solution and have effective viscosity and surface tension characteristics to assure satisfactory operation of the designated type of inkjet printer. Printers can be of the piezoelectric or bubble type. The viscosity of the liquid inks used in current piezoelectric inkjet printers is typically from 1.5 to 20 centipose (cps) and in the thermal inkjet printer is lower, e.g., from 1 to 5 cps. The desirable surface tension of liquid inkjet printer inks will typically be between 30-45 dynes/cm.

Experience has shown that printing in the desired color blue is especially difficult to achieve while also maintaining compliance with contradictory requirements from various Posts that require a high level of waterfastness, and very high contrast on porous media. In addition due to high processing speeds for a practical postal ink, there is a need for fast drying inks; and this can be also contradictory to meeting contrast criteria.

The new formulations of the invention are hybrid inks, which mix essential pigments and dyes, with some discretion as to optional colorants, to achieve the desired contrast and hue to enable desirable results on a broad range of substrates.

The following table identifies a range of substrates for which the inks of the invention have been shown to be effective in printing with a contrast of at least about 70% while also meeting other important criteria.

TABLE 1

| Country and Envelope Number | Porosity (Sheffield) | Smoothness (Sheffield) | Cobb Sizing (g/m$^2$) | pH |
|---|---|---|---|---|
| DE 1 | 164 | 143.4 | 30 | 7.97 |
| DE 2 | 98.8 | 254.1 | 22 | 7.26 |
| DE 3 | 125 | 228.4 | 24 | 7.31 |
| DE 4 | 36 | 19.3 | 51 | 8.71 |
| DE 5 | 36 | 84.5 | 82 | 8.86 |
| FR EN2003 | — | — | 30 | — |
| FR EN1615 | 55 | 206 | 55.3 | — |
| FR EN1618 | 93 | 217 | 32.1 | — |
| FR EN1977 | 94 | 287 | 28.3 | — |
| FR EN3745 | 40 | 179 | 40 | — |
| US A | 148 | 175 | 140 | 8.58 |

The inks of the invention will have a tightly defined blue color as is necessary to meet the visual and contrast requirements for the purpose of postal franking. The blue color is defined as $L^*<45$, $25<C^*<28$, $255<h<278$. The CIE $L^*C^*h$ is the cylindrical version of CIELUV and is known as CIE $LCH_{uv}$, where $L^*$ is the lightness, $C^*$ is the chroma and h is the hue. According to CIE (International Commission on Illumination) standards the CIE 1976 ($L^*$, $u^*$, $v^*$) color space, also known as the CIELUV color space, is a color space adopted by the International Commission on Illumination (CIE) in 1976, as a simple-to-compute transformation of the 1931 CIE XYZ color space, but which attempted perceptual uniformity. It is extensively used for applications such as computer graphics which deal with colored lights. Although additive mixtures of different colored lights will fall on a line in CIELUV's uniform chromaticity diagram (dubbed the CIE 1976 UCS), such additive mixtures will not, contrary to popular belief, fall along a line in the CIELUV color space unless the mixtures are constant in lightness.

The inks of the invention provide excellent readability of 2D bar codes on porous and coated substrates as measured by Integra Verifier (grade A) with red filter.

As noted, the new ink formulations of the invention are hybrid inks which mix pigments and dyes. The inks of the invention overcome a problem associated with high-pigment content formulations, which can have adverse effects on maintenance in terms of built-in purging and wiping systems. On the other hand, entirely dye based systems will not provide images with the necessary waterfastness. The inks of the invention will typically contain at least about 4% by weight of a colorant mixture comprising a mixture of dyes and pigments, yet enable good jettability.

The ink compositions of the invention will preferably include Pigment Blue 60 and dyes, such as Acid Blue 90, to achieve the color defined above. Also useful are red dyes, such as Acid Red 289, yellow dyes, such as Acid Yellow 23, magenta dyes such as Pigment red 122, carbon black and other optional pigments, such as cyan Pigment Blue 15:3, in total of no more than a minor amount, e.g., less than about 25%, based on the combined weight of the Pigment Blue 60 and the Acid Blue 90. Among alternative formulations, are those employing a colorant mixture comprising either a mixture of cyan and magenta pigments with a least one dye, or blue pigment in combination with magenta, cyan red, and yellow dyes. The colorants exemplified below and others chosen as effective within this description will all provide the blue color defined as $L^*<45$, $25<C^*<28$, $255<h<278$, and will provide the desired contrast when formulated in accord with this description.

The inks employ a penetrant, preferably triethylene glycol monobutyl ether (TGMBE, molecular weight of 206), as well as anionic surfactants in the formulations of the invention facilitate the desired drying time without destabilizing the dispersion of pigments.

The blue ink compositions of the invention are water-based inks for inkjet recording and comprise colorant mixtures in combination with glycerol and polyethylene glycol 200 (i.e., MW 200) as water-soluble organic solvents, preferably in an amount of from about 20 to about 30% by weight of the ink composition and at a ratio of glycerol to polyethylene glycol of from about 2:1 to about 3.5:1. The inks will comprise water, preferably in an amount of at least about 40%, e.g., from about 50 to about 70%, of the weight of the compositions.

The amount of the water-soluble solvents compared to the colorants can be important to obtain the best properties for jettability along with image properties, and preferably the weight ratio of a total amount of glycerol and polyethylene glycol 200 to an amount of C.I. Pigment Blue 60 is 8:1 or more and, preferably less than about 15:1. The examples which follow provide a guide to most effective relative amounts. Preferably, an amount of C.I. Pigment Blue 60 relative to a total amount of the water-based ink is in the range of about 0.1% to about 5% by weight. Typically, the colorant, which is a mixture, comprises at least 4% by weight of the composition and the Pigment Blue 60 will comprise at least 1% by weight of the composition. Using the examples as a guide, it can be seen that inks employing a ratio of pigment to dye in the colorant is within the range of from about 1:2 to about 2.5:2, will be effective.

The inks also employ a polymeric dispersant for stabilizing the dispersion and preventing coagulation or displacement by other components such as, for example, the dye used.

Another characteristic important to the proper functioning of the inks of the invention is compatibility with other inks because seamless mixing is a very challenging target and one that is critical to image quality. The present ink concept achieves this goal by having bridging components such as the polymeric dispersant, which is preferably one selected from the group consisting of acrylic polymer, styrene acrylic copolymer, styrene Maleic copolymer and styrene methacrylic copolymer. The preferred polymeric dispersant is styrene acrylic copolymer (e.g., as JONCRYL 62J from BASF, available as an aqueous solution with 34% nonvolatiles and a viscosity of 2,500 cps), and is preferably employed in the inks of the invention in an amount of from about 0.5 to about 10% by weight of the composition, typically being from 1 to 3%. Using the examples as a guide, it can be seen that inks employing a ratio of the dispersant to colorants within the range of from about 4:10 to about 7:10, will be effective.

Reliability is an important attribute and advantage of the inks of the invention. Before the invention, it appeared that the achievement of inks with all the necessary print performance qualities using pigments or hybrid mixtures would have a tendency to dry more at the nozzles and to precipitate and cake formation around the nozzle plate. These old inks are not reliable. However, the invention provides reliability in the formulations due to the hybrid character of the inks, the use of resolubilizing resin combined and a compatible water-soluble organic solvent blend comprised of specific polyols. The combination of the specific water-soluble organic solvents with the polymer dispersant is effective in maintaining an equilibrium at the nozzle interface and provides consistent redispersability of cake formed at the nozzle. The net effect, in addition to the contradictory and diverse print quality requirements (e.g., color, readability, waterfastness, light fastness, drying time, print growth, and the like), is the provision of predictable performance and high quality over time.

Among other ingredients of the inks of the invention are surfactants. Among these are ionic and nonionic species. Anionic species such as sodium alkyl sulfonates, cationic surfactants such as cetyl trimethylammonium bromide, zwitterionic surfactants such as sulfobetaines, and non ionic surfactants such as alkyl polyethylene oxides (e.g., available as Igepals), non-ionic acetylenic diol surfactants (e.g., surfinols), etc., can be employed, at effective levels, with preferred surfactants being anionic surfactants such as dodecylbenzenesulfonic acid sodium salt. Representative surfactant concentrations will be from about 0.2 to about 2.0% of the weight of the compositions.

Another important characteristic achieved by this new inks is the shelf life (1 to 2 years) by preventing undesirable particulate formation by accelerated aging.

In another aspect, the invention provides a process for printing an image having a visible, blue image with at least 70% contrast, comprising: providing a piezoelectric or thermal inkjet printer with an ink as described above, and printing an image with the ink on a substrate. As noted above, it is an advantage of the invention that the inks can print images on a wide variety of substrates in the desired blue color and with high contrast and durability and still provide excellent jettability. The examples below further illustrate this advantage.

In another aspect, the invention provides printed images prepared with the inks and by the process described above. It is an advantage of the invention, as pointed out above, that the images can be printed on a wide variety of substrates in the desired blue color and with high contrast and durability as noted.

The following examples are presented to further illustrate and explain the invention and are not to be taken as limiting in any regard. Unless otherwise indicated, all parts and percentages are by weight.

EXAMPLES

Below are comparisons of the new formulations tested for jettability against other, apparently similar ink formulations.

The following table summarizes results of tests, which show the improvements of the ink compositions of the invention for achieving superior jettability, which is a key factor in printer reliability. In the examples, water makes up the balance of the 100% of the formulations.

|  | Example | | | Comparative Example | | | | | | | |
|---|---|---|---|---|---|---|---|---|---|---|---|
|  | 1 | 2 | 3 | 1 | 2 | 3 | 4 | 5 | 6 | 7 | 8 |
| C.I. Pigment Blue 60 | 2 | 2 | 1.5 | 2 | 2 | 2 | 2 | 2 | 2 | 3 | 1.5 |
| Dispersant Polymer JONCRYL 62J from BASF | 2.5 | 2.5 | 1.88 | 2.5 | 2.5 | 2.5 |  |  | 2.5 | 5 | 1.88 |
| C.I. Acid Blue 90 | 2.2 | 2.2 | 2.2 | 2.2 | 2.2 | 2.2 |  |  | 2.2 | 2.2 |  |
| Glycerol | 18.5 | 16.5 | 20 | 14.5 | 20.5 | 18.5 | 18.5 | 18.5 | 18.5 | 16.5 |  |
| Polyethylene Glycol #200 | 6 | 8 | 6 | 10 | 4 |  |  |  |  | 6 |  |
| Diethylene Glycol |  |  |  |  |  |  | 6 |  |  |  | 6 |
| Triethylyene Glycol |  |  |  |  |  |  |  | 6 |  |  |  |
| Polyethylene Glycol #600 |  |  |  |  |  |  |  |  | 6 |  |  |
| 2-Pyrolidone |  |  |  |  |  |  |  |  |  | 6 |  |
| C.I. Acid Red 289 | 0.17 | 0.17 | 0.17 | 0.17 | 0.17 | 0.17 | 0.17 | 0.17 | 0.17 | 0.17 | 0.17 |
| C.I. Acid Yellow 23 | 0.12 | 0.12 | 0.12 | 0.12 | 0.12 | 0.12 | 0.12 | 0.12 | 0.12 | 0.12 | 0.12 |
| Triethyleneglycol monobutyl ether | 2 | 2 | 2 | 2 | 2 | 2 | 2 | 2 | 2 | 2 | 2 |
| Anionic surfactant, Dodecylbenzenesulfonic Acid Sodium Salt | 0.5 | 0.5 | 0.5 | 0.5 | 0.5 | 0.5 | 0.5 | 0.5 | 0.5 | 0.5 | 0.5 |
| Jettability | Good | Good | Good | Bad | Bad | Bad | Bad | Bad | Bad | Bad | Bad |

The parameter jettability in the above table is determined as follows:

Procedure: Leave Print Head without caping nozzles (=decap)
Condition: 60° C. and 40% relative humidity for 1 day
Evaluation: Print after a purge (=cleaning)
"Good" means the ink drops from all nozzles were fired.
"Bad" means the ink drops from all nozzles were not fired.

While the present invention has been disclosed and described with reference to a single embodiment thereof, it will be apparent, as noted above that variations and modifications may be made therein. It is also noted that the present invention is independent of the machine being controlled, and is not limited to the control of inserting machines. It is, thus, intended in the following claims to cover each variation and modification that falls within the true spirit and scope of the present invention.

What is claimed is:

1. A water-based ink for inkjet recording having a blue color defined as $L^*<45$, $25<C^*<28$, $255<h<278$, comprising: a colorant including C.I. Pigment Blue 60 and dye, glycerol, polyethylene glycol 200 and water, wherein the weight ratio of glycerol to polyethylene glycol 200 is within the range of from 2:1 to 3.5:1.

2. The water-based ink according to claim 1, wherein the water-based ink comprises C.I. Acid Blue 90 as a colorant.

3. The water-based ink according to claim 1, wherein a weight ratio of a total amount of glycerol and polyethylene glycol 200 to an amount of C.I Pigment Blue 60 is 8 or more.

4. The water-based ink according to claim 1, wherein an amount of C.I. Pigment Blue 60 relative to a total amount of the water-based ink is in the range of 0.1% by weight to 5% by weight of the composition.

5. The water-based ink according to claim 1, wherein the colorant comprises at least 4% by weight of the composition.

6. The water-based ink according to claim 5, which further includes a polymeric dispersant and the ratio of the dispersant to colorants within the range of from 4:10 to 7:10.

7. The water-based ink according to claim 6, wherein the ink provides images with at least 70% contrast on diverse envelope surfaces, with at least 99% readability of 2D bar codes on porous and coated substrates.

8. The water-based ink according to claim 6, wherein the ratio of pigment to dye in the colorant is within the range of from 1:2 to 2.5:2.

9. The water-based ink according to claim 6, wherein the ratio of glycerine to polyethylene glycol 200 humectants are present in an amount of from about 20 to 30% by weight of the ink.

10. The water-based ink according to claim 1, wherein the ink comprises a colorant mixture comprising either a mixture of cyan and magenta pigments with a least one dye, or blue pigment in combination with magenta, cyan red, and yellow dyes.

11. A process for printing an image having a visible, blue image with at least 70% contrast, comprising: providing a piezoelectric inkjet printer with an ink as described in claim 1, and printing an image with the ink on a substrate.

12. A printed image prepared by the process of claim 11.

13. The water-based ink according to claim 1, which further includes a surfactant present in an amount of from about 0.2 to 2.0% by weight of the ink.

14. The water-based ink according to claim 1, which further includes a penetrant present in an amount of about 2.0% by weight of the ink.

15. The water-based ink according to claim 1, which further includes a polymeric dispersant present in an amount of from about 0.5 to 10% by weight of the ink.

* * * * *